(12) United States Patent
Lim et al.

(10) Patent No.: US 10,819,836 B2
(45) Date of Patent: Oct. 27, 2020

(54) CONDUIT STRUCTURE OF ELECTRONIC DEVICE AND ELECTRONIC DEVICE INCLUDING THE SAME

(71) Applicant: Samsung Electronics Co., Ltd., Gyeonggi-do (KR)

(72) Inventors: Jinho Lim, Gyeonggi-do (KR); Seungjae Bae, Gyeonggi-do (KR); Yonghwa Kim, Gyeonggi-do (KR); Jinyoung Park, Gyeonggi-do (KR); Bokyung Sim, Gyeonggi-do (KR); Byounguk Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/387,059

(22) Filed: Apr. 17, 2019

(65) Prior Publication Data
US 2019/0320050 A1    Oct. 17, 2019

(30) Foreign Application Priority Data

Apr. 17, 2018    (KR) ......................... 10-2018-0044681

(51) Int. Cl.
    *H04R 1/02*        (2006.01)
    *H04M 1/03*       (2006.01)
    *H04R 1/32*        (2006.01)

(52) U.S. Cl.
    CPC ............... *H04M 1/03* (2013.01); *H04R 1/02* (2013.01); *H04R 1/326* (2013.01)

(58) Field of Classification Search
None
See application file for complete search history.

(56) References Cited

U.S. PATENT DOCUMENTS 9,609,409 B2    3/2017    Dave et al.
2010/0331058 A1    12/2010    Qingshan et al.
(Continued)

FOREIGN PATENT DOCUMENTS

KR    10-2007-0010638    1/2007
KR    10-2014-0049348    4/2014
(Continued)

OTHER PUBLICATIONS

International Search Report dated Jul. 11, 2019 issued in counterpart application No. PCT/KR2019/003768, 8 pages.

*Primary Examiner* — Gary Lafontant
(74) *Attorney, Agent, or Firm* — The Farrell Law Firm, P.C.

(57) ABSTRACT

A conduit structure of an electronic device and an electronic device are provided. The conduit structure includes an inner structure including a front surface and a rear surface, wherein the front surface includes a first region configured to receive a display and a second region, which is a remaining area of the front surface of the inner structure; a receiver hole configured to penetrate the second region and to connect a receiver receiving space and an external space of the inner structure; a first through-hole configured to penetrate the first region and to connect the receiver receiving space and the front surface of the inner structure; a second through-hole, which is spaced apart from the first through-hole, configured to penetrate the first region and to connect the rear surface of the inner structure; and a flow path configured to connect the first through-hole and the second through-hole at the front surface of the inner structure.

20 Claims, 17 Drawing Sheets

(56) References Cited

U.S. PATENT DOCUMENTS

2014/0050348 A1    2/2014   Hawker et al.
2016/0014488 A1    1/2016   Iwaya
2017/0134545 A1    5/2017   Lee et al.
2017/0149942 A1    5/2017   Lee et al.

FOREIGN PATENT DOCUMENTS

KR        10-1636461       6/2016
KR        10-2017-0059083       5/2017
KR        20180020653 A  *   2/2018
KR        1020180020653       2/2018

* cited by examiner

CONDUIT STRUCTURE OF ELECTRONIC DEVICE AND ELECTRONIC DEVICE INCLUDING THE SAME

CROSS-REFERENCE TO RELATED APPLICATION(S)

This application is based on and claims priority under 35 U.S.C. § 119 to Korean Patent Application Serial No. 10-2018-0044681, filed on Apr. 17, 2018, in the Korean Intellectual Property Office, the entire disclosure of which is incorporated herein by reference.

BACKGROUND

1. Field

The present disclosure relates generally to a conduit structure of an electronic device and an electronic device including the conduit structure, and more particularly, to a conduit structure for connecting the inside and the outside of an electronic device and an electronic device including the conduit structure.

2. Description of the Related Art

Electronic devices may have holes or conduits for providing access to the insides of the electronic devices from the outside thereof. However, as electronic devices become slimmer, the space available for forming a hole or a conduit is reduced.

Accordingly, efforts have been made to form a hole or a conduit in the limited space of an electronic device.

For example, in a full front type electronic device in which a display area gradually increases at a front surface thereof, an external communication hole or conduit may be provided for a specific electronic component.

SUMMARY OF THE INVENTION

The present disclosure has been made to address at least the disadvantages described above and to provide at least the advantages described below.

An aspect of the present disclosure is to provide an electronic device including a hole or conduit for accessing an internal component thereof from the outside.

In accordance with an aspect of the present disclosure, a conduit structure of an electronic device is provided, which includes an inner structure including a front surface and a rear surface, wherein the front surface includes a first region configured to receive a display and a second region, which is a remaining area of the front surface of the inner structure; a receiver hole configured to penetrate the second region and to connect a receiver receiving space and an external space of the inner structure; a first through-hole configured to penetrate the first region and to connect the receiver receiving space and the front surface of the inner structure; a second through-hole, which is spaced apart from the first through-hole, configured to penetrate the first region and to connect the rear surface of the inner structure; and a flow path configured to connect the first through-hole and the second through-hole at the front surface of the inner structure.

In accordance with an aspect of the present disclosure, an electronic device is provided, which includes a display; an inner structure including a front surface and a rear surface, wherein the front surface includes a first region configured to receive the display and a second region, which is a remaining area of the front surface of the inner structure; a receiver receiving space positioned at the rear surface of the inner structure and configured to receive a receiver; a receiver hole connected to the receiver receiving space and configured to penetrate the second region; a first through-hole configured to penetrate the first region and to connect the receiver receiving space and the front surface of the inner structure; a second through-hole spaced apart from the first through-hole to penetrate the first region and configured to connect the rear surface of the inner structure; and a flow path configured to connect the first through-hole and the second through-hole at the front surface of the inner structure.

In accordance with an aspect of the present disclosure, an electronic device is provided, which includes a housing including a first plate, a second plate configured to face in a direction opposite to that of the first plate, and a side member configured to enclose a space between the first plate and the second plate; a display exposed through a first region of the first plate; an inner structure disposed between the display and the second plate; a speaker disposed between the inner structure and the second plate, wherein the speaker communicates sound to outside of the housing through a first opening formed in a second region of the first plate, comprises a surface facing the first plate, and is spaced apart from the inner structure to form a first channel between the surface and the inner structure; a microphone disposed between the inner structure and the second plate, wherein the microphone is spaced apart from the speaker; a second opening configured to penetrate the inner structure between the microphone and the display; a second channel formed between the inner structure and the display; and a third opening configured to penetrate the inner structure between the first channel and the second channel. The microphone is configured to penetrate the first opening to receive sound from the outside of the housing.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS

Figure 1:
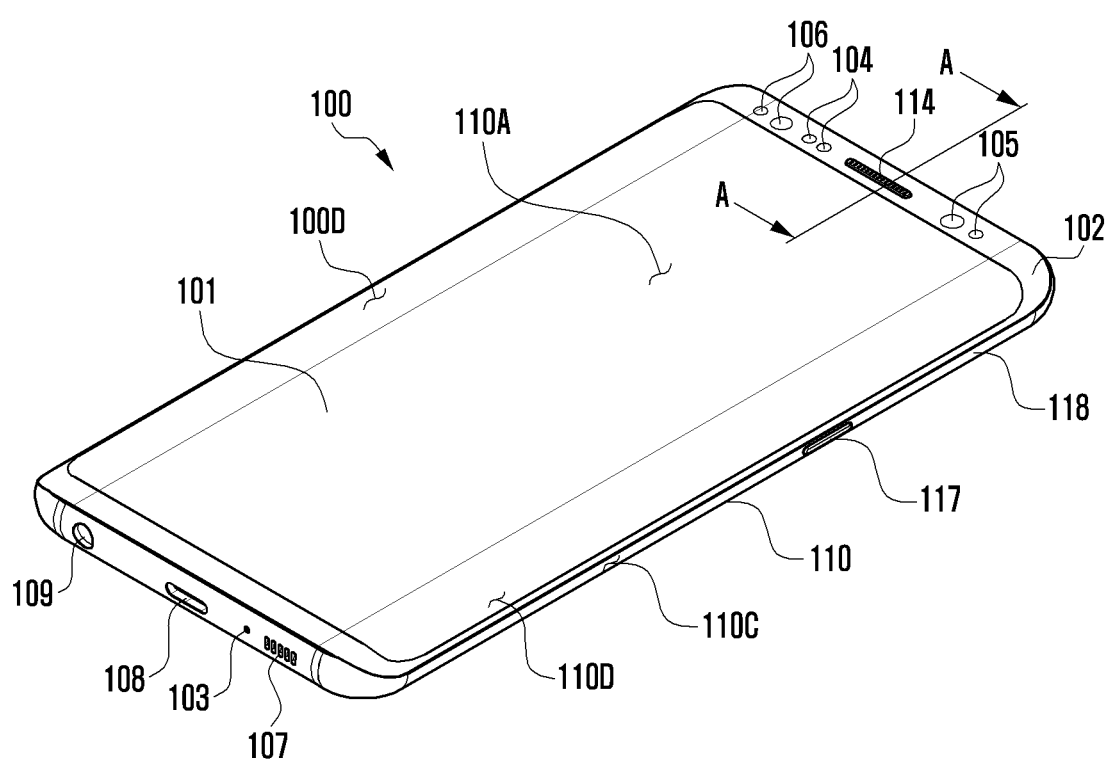
FIG. 1 illustrates a perspective view of a front surface of a mobile electronic device according to an embodiment.

Various embodiments of the present disclosure will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

In the description of the drawings, similar reference numerals are used for similar elements.

Figure 2:
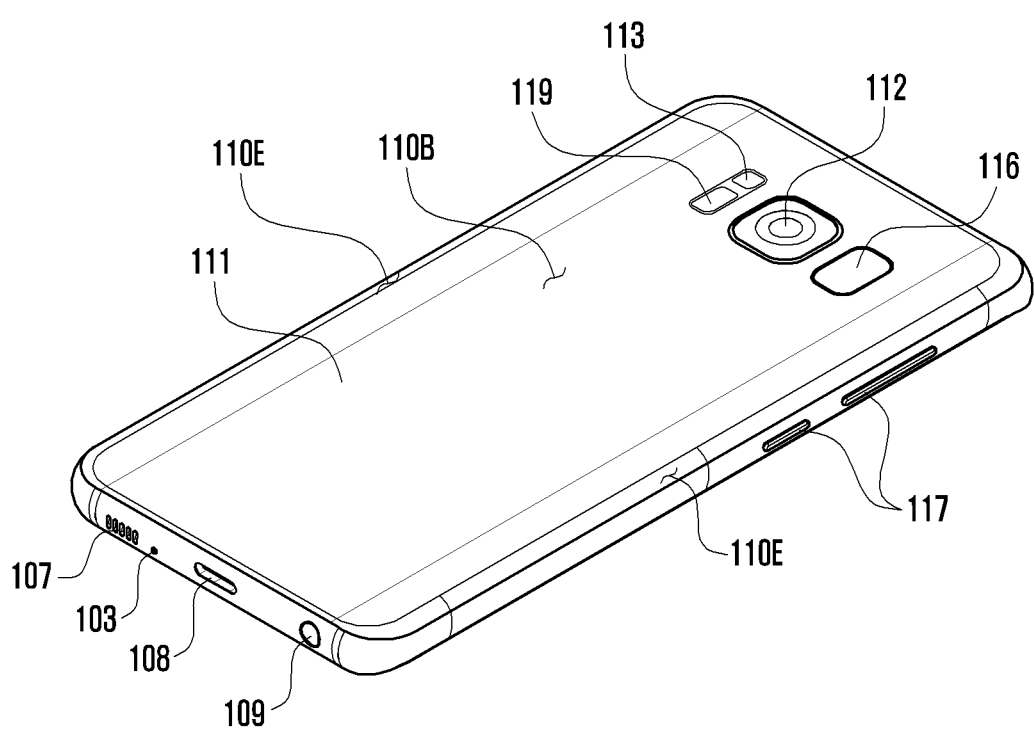
FIG. 2 illustrates a perspective view of a rear surface of the electronic device of FIG. 1, according to an embodiment.

FIG. 1 illustrates a perspective view of a front surface of a mobile electronic device according to an embodiment, and FIG. 2 illustrates a perspective view of a rear surface of the electronic device of FIG. 1, according to an embodiment.

Referring to FIGS. 1 and 2, an electronic device 100 includes a housing 110 including a first surface (or a front surface) 110A, a second surface (or a rear surface) 110B, and a side surface 110C surrounding the space between the first surface 110A and the second surface 110B. Alternatively, the housing may form a part of the first surface 110A, the second surface 110B, and the side surface 110C illustrated in FIG. 1.

The first surface 110A is formed by a front plate 102, at least apart of which is substantially transparent (e.g., a glass plate including various coating layers, or a polymer plate). The second surface 110B is formed by a rear plate 111 that may be substantially opaque. The rear plate 111 may be made of coated or colored glass, ceramic, polymer, metal (e.g., aluminum, stainless steel, or magnesium), or a combination of materials. The side surface 110C is formed by a side bezel structure (or a "side member") 118, which is coupled to the front plate 102 and to the rear plate 111. The side bezel structure 118 may be made of metal and/or polymer materials. Alternatively, the rear plate ill and the side bezel structure 118 may be formed integrally, and/or may be made of the same material (e.g., a metal material such as aluminum).

In FIGS. 1 and 2, the front plate 102 includes two first areas 110D on both ends of the long edge of the front plate 102, such that the two first areas 110D bend from the first surface 110A toward the rear plate 111 and extend seamlessly. Similarly, as illustrated in FIG. 2, the rear plate 111 includes two second areas 110E on both ends of the long edge, such that the two second areas 110E bend from the second surface 110B toward the front plate 102 and extend seamlessly. Alternatively, the front plate 102 (or the rear plate 111) may include only one of the first areas 110D (or the second areas 110E). As another alternative, a part of the first areas 110D or the second areas 110E may be omitted.

When viewed from the side surface of the electronic device 100, the side bezel structure 118 has a first thickness (or width) on a part of the side surface, which does not include the first areas 110D or the second areas 110E, and has a second thickness that is smaller than the first thickness on a part of the side surface, which includes the first areas 110D or the second areas 110E.

The electronic device 100 includes a display 101, audio modules 103, 107, and 114, sensor modules 104, 116, and 119, camera modules 105, 112, and 113, a key input device 117, a light-emitting element 106, and connector holes 108 and 109. Alternatively, at least one of the constituent elements (e.g., the key input device 117 or the light-emitting element 106) of the electronic device 100 may be omitted, or the electronic device 100 may include additional constituent element.

The display 101 is exposed through a corresponding part of the front plate 102. For example, at least a part of the display 101 may be exposed through the front plate 102 that forms the first areas 110D of the side surface 110C and the first surface 110A. The display 101 may have a corner formed in substantially the same shape as that of the adjacent outer periphery of the front plate 102. In order to increase the area of exposure of the display 101, an interval between the outer periphery of the display 101 and the outer periphery of the front plate 102 may be formed to be substantially identical.

Alternatively, a recess or an opening may be formed in a part of the screen display area of the display 101, and at least one of an audio module 114, a sensor module 104, a camera module 105, and a light-emitting element 106 may be included and aligned with the recess or the opening.

On the back surface of the screen display area of the display 101, at least one of an audio module 114, a sensor module 104, a camera module 105, a fingerprint sensor 116, and a light-emitting element 106 may be included. The display 101 may be coupled to or arranged adjacent to a touch sensing circuit, a pressure sensor capable of measuring the intensity (pressure) of a touch, and/or a digitizer that detects a magnetic field-type stylus pen.

At least one of the sensor modules 104 and 119 and/or at least a part of the key input device 117 may be arranged in the first areas 110D and/or the second areas 110E.

The audio modules 103, 107, and 114 include a microphone hole 103 and speaker holes 107 and 114. A microphone for acquiring an external sound may be arranged in the microphone hole 103, and a plurality of microphones maybe arranged therein such that the direction of a sound can be sensed in some embodiments.

The speaker holes 107 and 114 include an outer speaker hole 107 and a speech receiver hole 114. Alternatively, the speaker holes 107 and 114 and the microphone hole 103 may be implemented as a single hole, or a speaker (e.g., a piezoelectric speaker) may be included without the speaker holes 107 and 114.

The sensor modules 104, 116, and 119 may generate an electric signal or a data value corresponding to the internal operating condition or the external environment condition of the electronic device 100. The sensor modules 104, 116, and 119 include a first sensor module 104 (e.g., a proximity sensor) arranged on the first surface 110A of the housing 110, a second sensor module 119 (e.g., a heart rate monitor (HRM) sensor) arranged on the second surface 110B of the housing 110, and a third sensor module 116 (e.g., a fingerprint sensor).

The electronic device may also include a fourth sensor module (e.g., a fingerprint sensor) that may be arranged on the first surface 110A (e.g., the display 101) of the housing 110, and/or on the second surface 110B.

The electronic device 100 may further include at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, a luminance sensor, etc.

The camera modules 105, 112, and 113 include a first camera device 105 arranged on the first surface 110A of the electronic device 100, a second camera device 112 arranged on the second surface 110B thereof, and a flash 113. The camera devices 105 and 112 may include a single lens or a plurality of lenses, an image sensor, and/or an image signal processor. The flash 113 may include a light-emitting diode or a xenon lamp. Two or more lenses (e.g., an infrared camera, a wide-angle lens, and a telephoto lens) and image sensors may be arranged on a single surface of the electronic device 100.

The key input device 117 is arranged on the side surface 110C of the housing 110. Alternatively, the electronic device 100 may omit a portion of the key input device 117 or the entire key input device 117, and/or the key input device 117 may be implemented in another manner, such as by a soft key, on the display 101. The key input device 117 may include a sensor module arranged on the second surface 110B of the housing 110.

The light-emitting element 106 is arranged on the first surface 110A of the housing 110, for example. The light-emitting element 106 may indicate a condition of the electronic device 100 using light, e.g., a flashing LED in a particular color. The light-emitting element 106 may also be used as a light source for the camera module 105. For example, the light-emitting element 106 may include an LED, an IR LED, and a xenon lamp.

The connector holes 108 and 109 include a first connector hole 108 containing a connector (e.g., a universal serial bus (USB) connector) for transmitting/receiving power and/or data to/from an external electronic device, and/or a second connector hole (e.g., an earphone jack) 109 containing a connector for transmitting/receiving an audio signal to/from the external electronic device.

Figure 3:
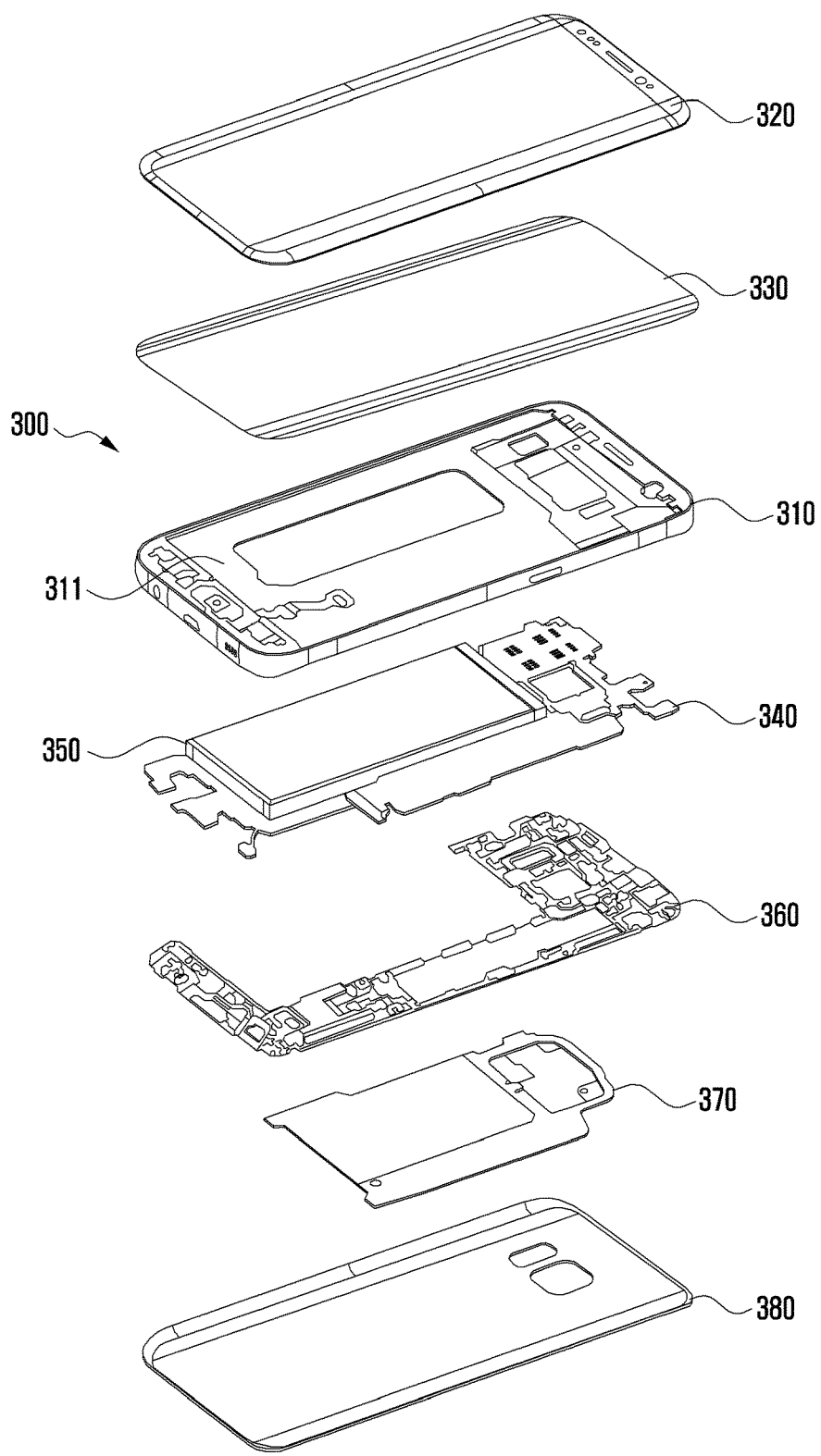
FIG. 3 illustrates an exploded perspective of an electronic device according to an embodiment.

FIG. 3 illustrates an exploded perspective of an electronic device according to an embodiment.

Referring to FIG. 3, an electronic device 300 includes a side bezel structure 310, a first support member 311 (e.g., a bracket), a front plate 320, a display 330, a printed circuit board 340, a battery 350, a second support member 360 (e.g., a rear case), an antenna 370, and a rear plate 380. Alternatively, at least one of the constituent elements (e.g., the first support member 311 or the second support member 360) of the electronic device 300 may be omitted, or the electronic device 300 may include an additional constituent element.

The first support member 311 is arranged inside the electronic device 300 and may be connected to the side bezel structure 310 or may be formed integrally with the side bezel structure 310. The first support member 311 may be made of a metal material and/or a nonmetal material (e.g., a polymer).

The display 330 is coupled to one surface of the first support member 311, and the printed circuit board 340 is coupled to the other surface thereof.

A processor, a memory, and/or an interface may be mounted on the printed circuit board 340. The processor may include a central processing device, an application processor, a graphic processing device, an image signal processor, a sensor hub processor, and/or a communication processor.

The memory may include a volatile memory or a non-volatile memory.

The interface may include a high definition multimedia interface (HDMI), a USB interface, a secure digital (SD) card interface, and/or an audio interface. The interface may connect the electronic device 300 with an external electronic device, electrically or physically, and may include a USB connector, an SD card/MMC connector, or an audio connector.

The battery 350 supplies power to at least one constituent element of the electronic device 300, and may include a non-rechargeable primary cell, a rechargeable secondary cell, or a fuel cell. At least a portion of the battery 350 may be arranged on substantially the same plane as the printed circuit board 340. The battery 350 may be arranged integrally inside the electronic device 300, or may be arranged such that the battery 350 can be attached to/detached from the electronic device 300.

The antenna 370 is arranged between the rear plate 380 and the battery 350. The antenna 370 may include a near field communication (NFC) antenna, a wireless charging antenna, and/or a magnetic secure transmission (MST) antenna. The antenna 370 may conduct near-field communication with an external device or may wirelessly transmit/receive power necessary for charging. Alternatively, an antenna structure may be formed by a part or a combination of the side bezel structure 310 and/or the first support member 311.

Figure 4:
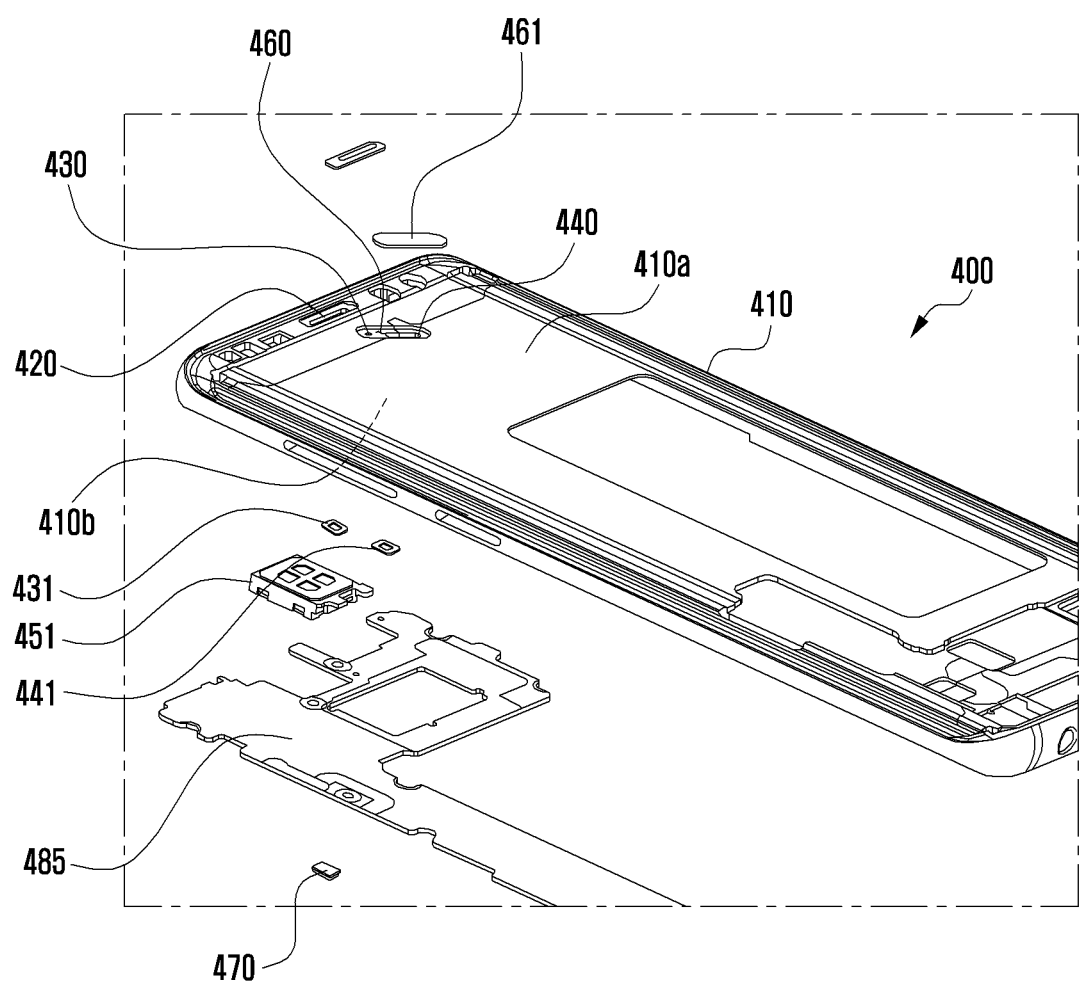
FIG. 4 illustrates an exploded perspective view of a conduit structure in an electronic device according to an embodiment.

FIG. 4 illustrates an exploded perspective view of a conduit structure in an electronic device according to an embodiment.

Referring to FIG. 4, an electronic device 400 includes an inner structure 410, gasket sheet 461, first sealing gasket 431, and second sealing gasket 441.

The inner structure 410 may be a basic frame for maintaining an entire shape of the electronic device 400. The inner structure 410 may include both the side bezel structure 310 and the first support member 311 illustrated in FIG. 3.

At a front surface 410*a* of the inner structure 410, the first plate 320 may be received, and at a rear surface 410*b* of the inner structure 410, the second plate 380 may be received.

The side member may be integrally formed with the inner structure 410 to enclose a space between the front surface 410*a* and the rear surface 410*b* of the inner structure 410.

A display 480 may be received by the front surface 410*a* of the inner structure 410, and a circuit board 485 may be disposed at the rear surface 410*b* of the inner structure 410. The front surface 410*a* and the rear surface 410*b* of the inner structure 410 may be defined based on a thickness direction of the electronic device 400. For example, the inner structure 410 may be stacked on a circuit board 485 positioned at the rear surface 410*b,* and the display 480 may be stacked on the front surface 410*a* of the inner structure 410.

In the inner structure 410, a receiver hole 420, a first through-hole 430, a second through-hole 440, and flow path 460 are formed. As illustrated in more detail in FIG. 6A, the receiver hole 420 may provide a passage between a receiver receiving space 450 and an external environment of the electronic device 400. The first through-hole 430 may provide a passage between the receiver receiving space 450 and the front surface 410a of the inner structure 410. The second through-hole 440 may provide a passage between the front surface 410a and the rear surface 410b of the inner structure 410.

The flow path 460 is formed at the front surface 410a of the inner structure 410. The flow path 460 may specify a connection path between the first through-hole 430 and the second through-hole 440 together with the gasket sheet 461.

The first sealing gasket 431 may block moisture from entering into the electronic device 400 via the receiver hole 420 and the first through-hole 430. The second sealing gasket 441 may guide a sound or gas entered through the receiver hole 420, the receiver receiving space 450, the first through-hole 430, and the flow path 460 towards the electronic component 470, but may also block inflow of moisture.

The inner structure 410 may include a first opening, a second opening, a third opening, a first channel, and a second channel. The first opening may correspond to the receiver hole 420, the second opening may correspond to the second through-hole 440, and the third opening may correspond to the first through-hole 430. The first channel may be part of the receiver receiving space 450, and the second channel may correspond to the flow path 460.

Figure 7:
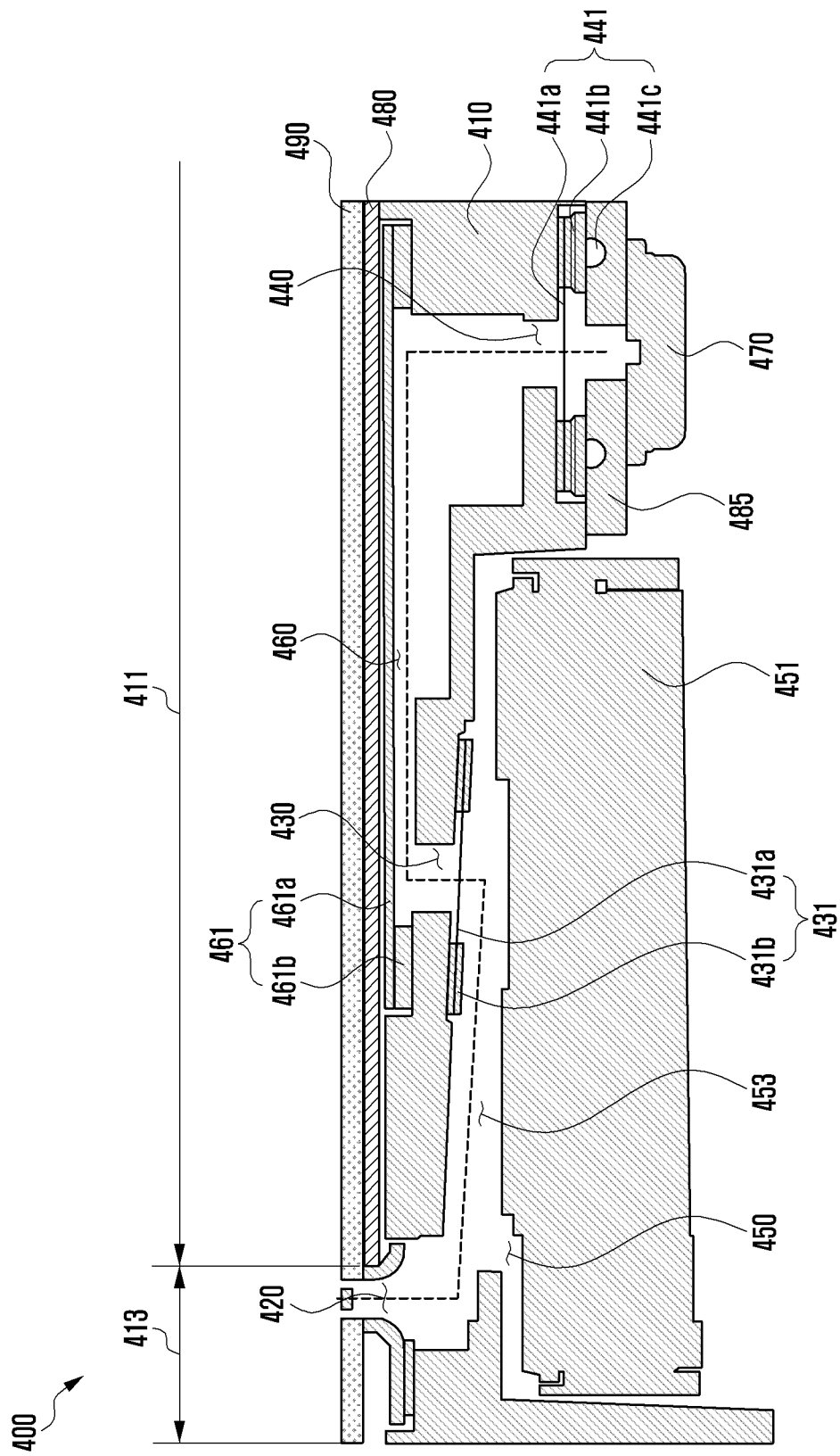
FIG. 7 illustrates a cross-sectional view of an inner structure of an electronic device taken along line AA of FIG. 1, according to an embodiment.

The first sealing structure may correspond to the gasket sheet 461, and the second sealing structure may correspond to the first sealing gasket 431. The second sealing gasket 441 may further include a waterproof sheet 441a, an adhesive member 441b, and an elastic structure 441c, as illustrated in FIG. 7.

FIGS. 5A to 5D illustrate diagrams of a front surface of an inner structure of the electronic device 400 according to an embodiment. The front surface of the inner structure refers to a surface of in which a display 480 is received, and the rear surface of the inner structure is a back surface of the front surface, and refers to a surface in which a receiver receiving space 450 or a circuit board 485 is positioned.

Figure 5A:
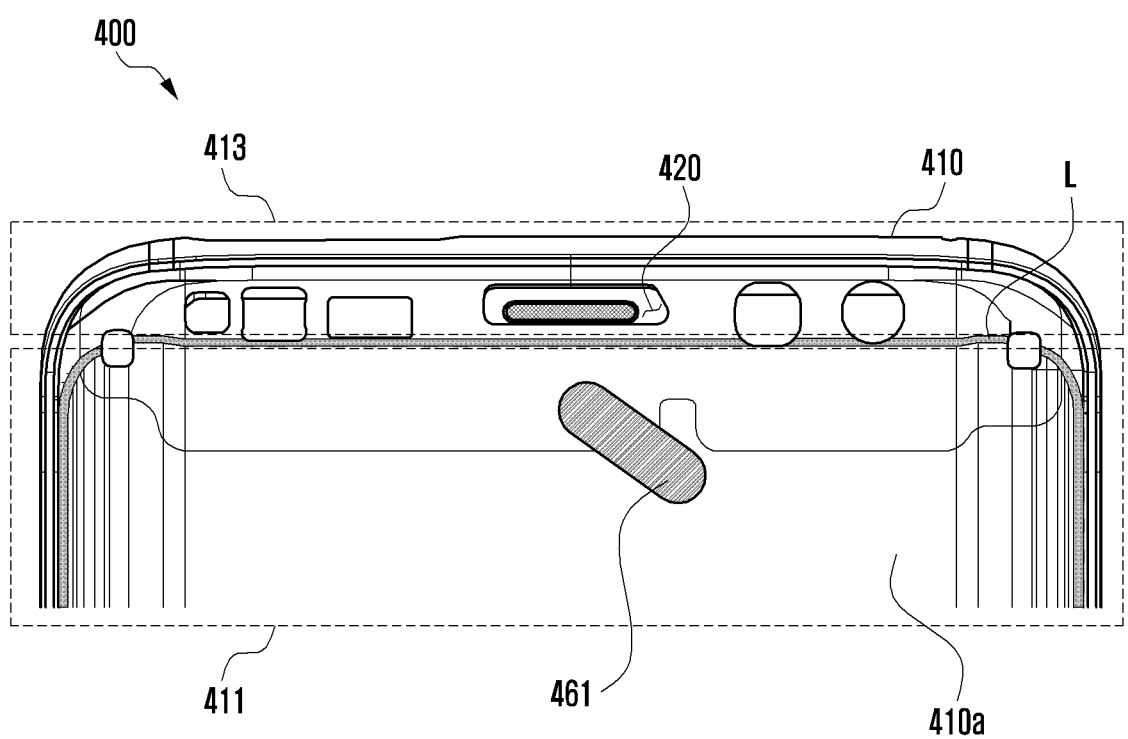
FIG. 5A illustrates a front surface and a gasket sheet of an inner structure of an electronic device according to an embodiment.

FIG. 5A illustrates a front surface and a gasket sheet of an inner structure of an electronic device according to an embodiment.

More specifically, FIG. 5A illustrates an upper portion of a front surface 410a of an inner structure 410 of the electronic device 400, with the window glass 490 and the display 480 removed therefrom.

Figure 5B:
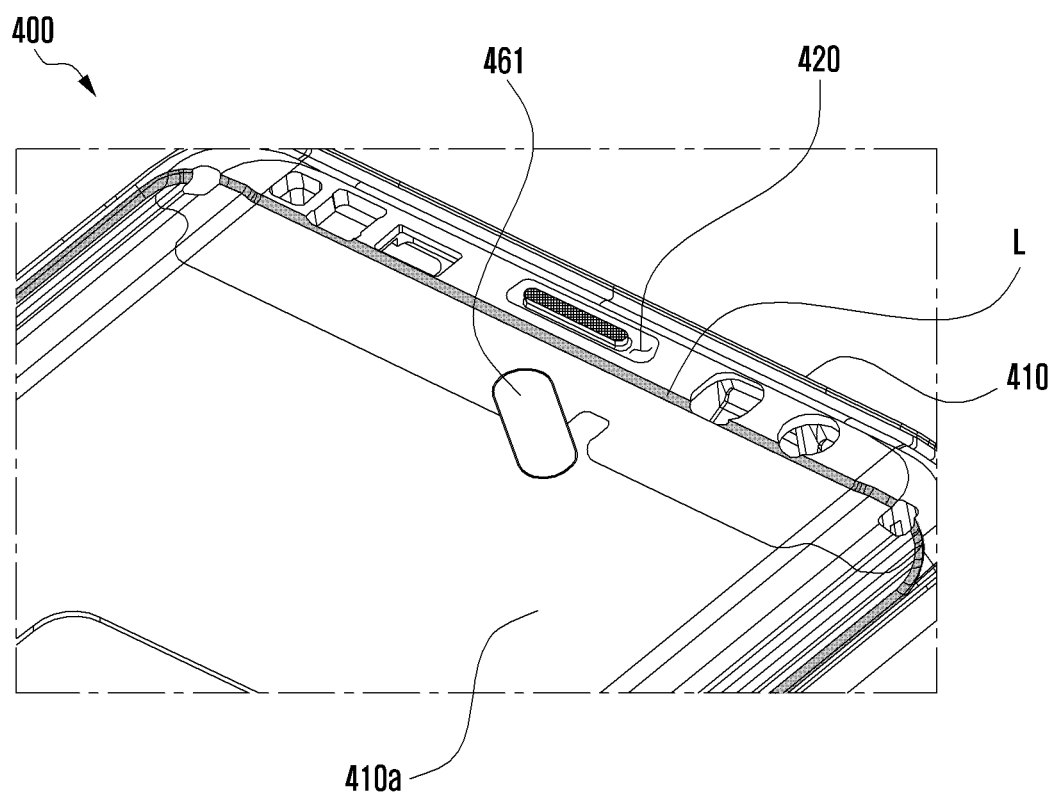
FIG. 5B illustrates an inner structure of an electronic device viewed according town embodiment.

FIG. 5B illustrates an inner structure of an electronic device viewed according to an embodiment.

Referring to FIGS. 5A and 5B, the inner structure 410 includes a first region 411 and a second region 413. The first region 411 is an area in which a display 480 is received, and the second region 413 is the remaining area.

In FIG. 5A, the first region 411 and the second region 413 are divided about a boundary line indicated by "L". The boundary line may be a step formed by the difference between a thickness of the first region 411 and a thickness of the second region 413 of the inner structure 410. That is, the first region 411 may be sunk to be relatively thinner than the second region 413 such that the display may be received therein. "L" may correspond to an outline portion of the display 480 when the display 480 is received, based on the front surface 410a of the inner structure 410 and represent a boundary between a portion in which the display is positioned and a portion in which the display 480 is not positioned. Window glass 490 may be formed to correspond to both the first region 411 and the second region 413.

The first region 411 and the second region 413 may penetrate a thickness direction of the electronic device based on a plane of the front surface 410a (or the rear surface 410b of the electronic device 400. For example, when the window glass is formed to correspond to both the first region 411 and the second region 413, in the first region 411, the display and the window glass are stacked in a thickness direction of the electronic device 400.

Although the first region 411 and the second region 413 are divided about the front surface 410a of the inner structure 410, the first region 411 and the second region 413 are not limited to the front surface 410a of the inner structure 410. For example, the first region 411 and the second region 413 may also be divided about a rear surface 410b of the inner structure 410.

Figure 5C:
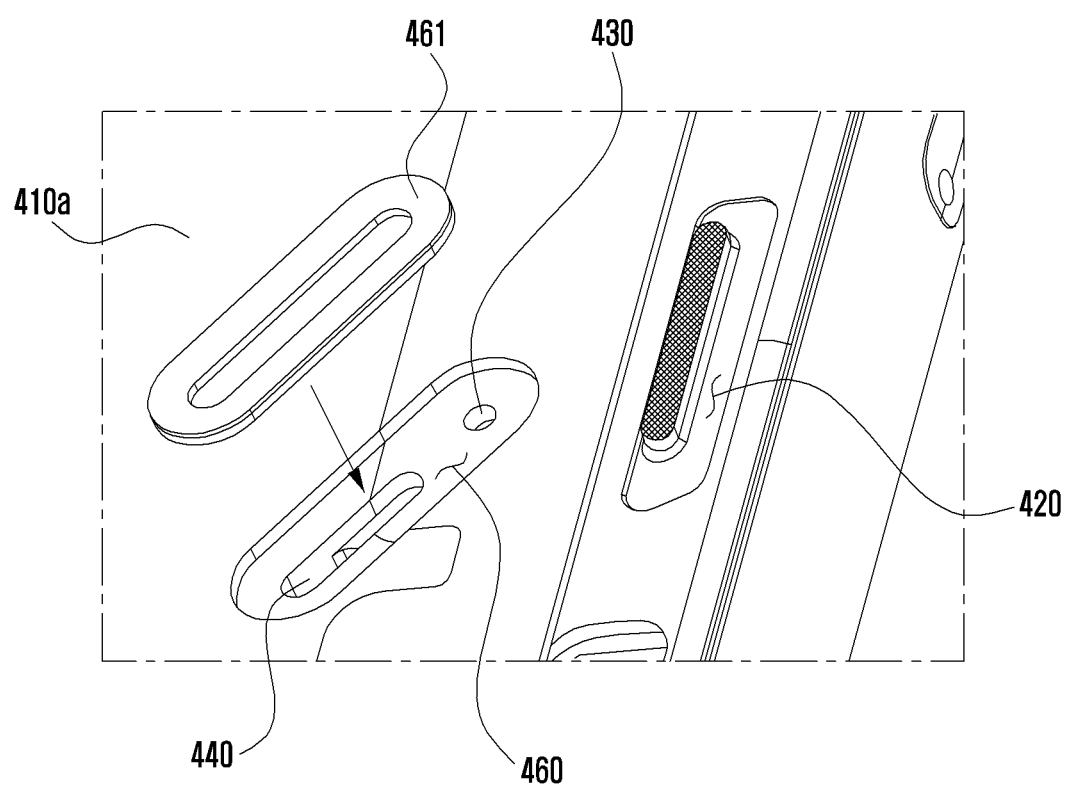
FIG. 5C illustrates an enlarged portion of a front surface of an electronic device according to an embodiment.

FIG. 5C illustrates an enlarged portion of a front surface of an electronic device according to an embodiment. More specifically, FIG. 5C is an exploded view illustrating the gasket sheet 461 and the flow path 460 connecting the first through-hole 430 and the second through-hole 440 of FIG. 5A.

Referring to FIG. 5C, the flow path 460 of the electronic device 400 may serve as a path for connecting the first through-hole 430 and the second through-hole 440 at the front surface 410a of the inner structure 410.

The flow path 460 may specify a connection path of the first through-hole 430 and the second through-hole 440 together with the gasket sheet 461. For example, at the front surface 410a of the inner structure 410, a groove connecting the first through-hole 430 and the second through-hole 440 may be formed, and the gasket sheet 461 may cover and seal the groove to specify a connection path of the first through-hole 430 and the second through-hole 440. Thereby, a path can be provided for a sound or gas entering from the outside to reach the electronic components, instead of being diffused into the electronic device.

Figure 5D:
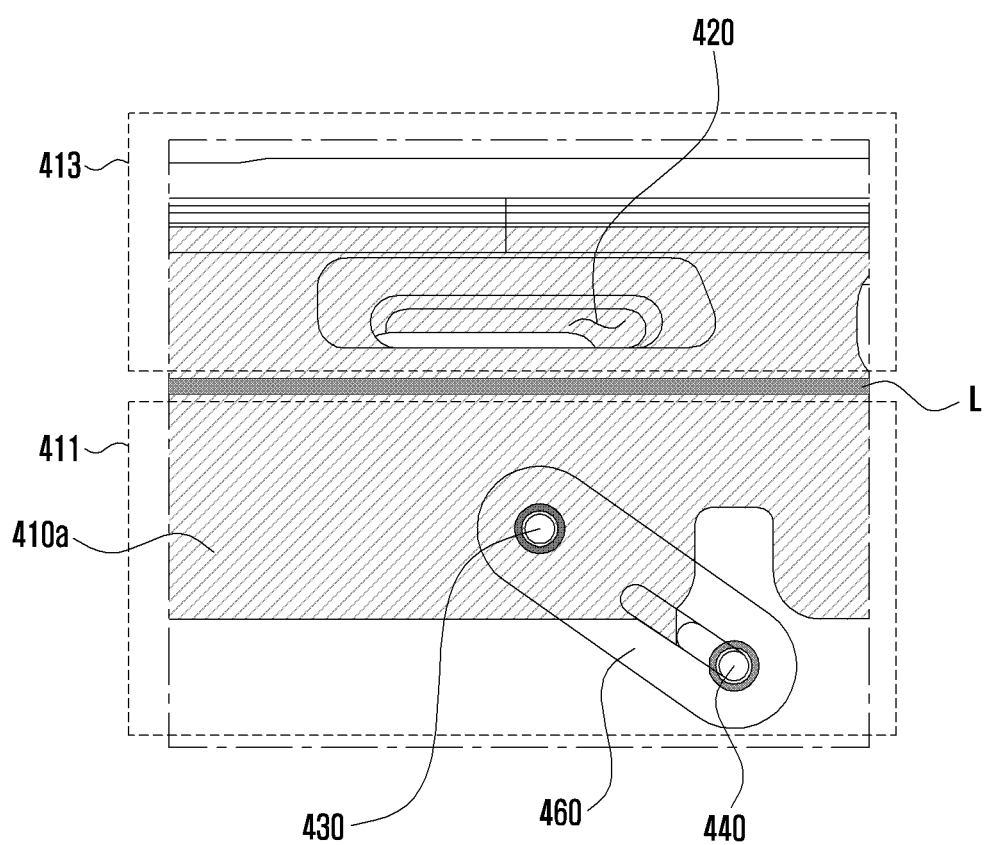
FIG. 5D illustrates an enlarged of an inner structure of an electronic device in which a gasket sheet is removed according to an embodiment.

FIG. 5D illustrates an enlarged of an inner structure of an electronic device in which a gasket sheet is removed according to an embodiment.

Referring to FIG. 5D, the receiver hole 420 of the electronic device 400 penetrates the second region 413 of the inner structure 410. The receiver hole 420 may be formed to penetrate the second region 413 of the inner structure 410 and may provide a passage between a receiver receiving space 450 and an external environment of the electronic device 400, in order to transfer a sound generated in a receiver 451 to the user. Therefore, the receiver hole 420 may be formed at a position that does not interfere with the display and be formed to penetrate window glass 490.

The first through-hole 430 and the second through-hole 440 of the electronic device 400 may be formed in the first region 411 of the inner structure 410. The first through-hole 430 may provide a passage between the receiver receiving space 450 and the front surface 410a of the inner structure 410. The second through-hole 440 may provide a passage between the front surface 410a and the rear surface (of the inner structure 410 in the first region 411.

The front surface 410a or the rear surface of the inner structure 410 may refer to a space of the front surface side or the rear surface side of the inner structure 410, as well as a surface of the inner structure 410. The front surface 410a of the inner structure 410 may be an open space and may form a closed space together with the display 480 (or the window glass 490. A rear surface of the inner structure 410 may be an open space and may form a closed space together with a circuit board.

For example, the receiver hole 420 may connect a receiver internal space positioned at a rear surface of the inner structure 410 and an open external space of the front surface 410*a* of the inner structure 410. Further, the second through-hole 440 is a hole formed to penetrate the first region 411 of the inner structure 410 and may connect a closed space formed by the front surface 410*a* of the inner structure 410 and the display and a closed space formed by the rear surface of the inner structure 410 and the circuit board.

The first through-hole 430 and the second through-hole 440 may be disposed such that an imaginary straight line connecting the first through-hole 430 and the second through-hole 430 is not aligned with a longitudinal direction or a width direction of the inner structure 410 in either one of the front surface 410*a* and the rear surface 410*b* of the inner structure 410. The longitudinal direction of the inner structure 410 may refer to a vertical direction in FIG. 5D, and the width direction thereof may refer to a lateral direction. That is, in FIG. 5D, an imaginary line connecting the first through-hole 430 and the second through-hole 440 may be diagonally disposed.

A position of the second through-hole 440 may be determined according to a position of an electronic component. For example, as illustrated in FIGS. 5A to 5D, the second through-hole 440 may be disposed to position at a diagonal line or may be aligned in a longitudinal direction of the inner structure 410.

FIGS. 6A to 6D illustrate diagrams of a rear surface 410*b* of the inner structure 410 of the electronic device 400 according to an embodiment.

As described above, the front surface 410*a* of the inner structure 410 may refer to a surface in which a display is placed, and the rear surface 410*b* of the inner structure 410 is a back surface of the front surface 410*a,* and may refer to a surface in which the receiver receiving space 450 or a circuit board is positioned.

Figure 6A:
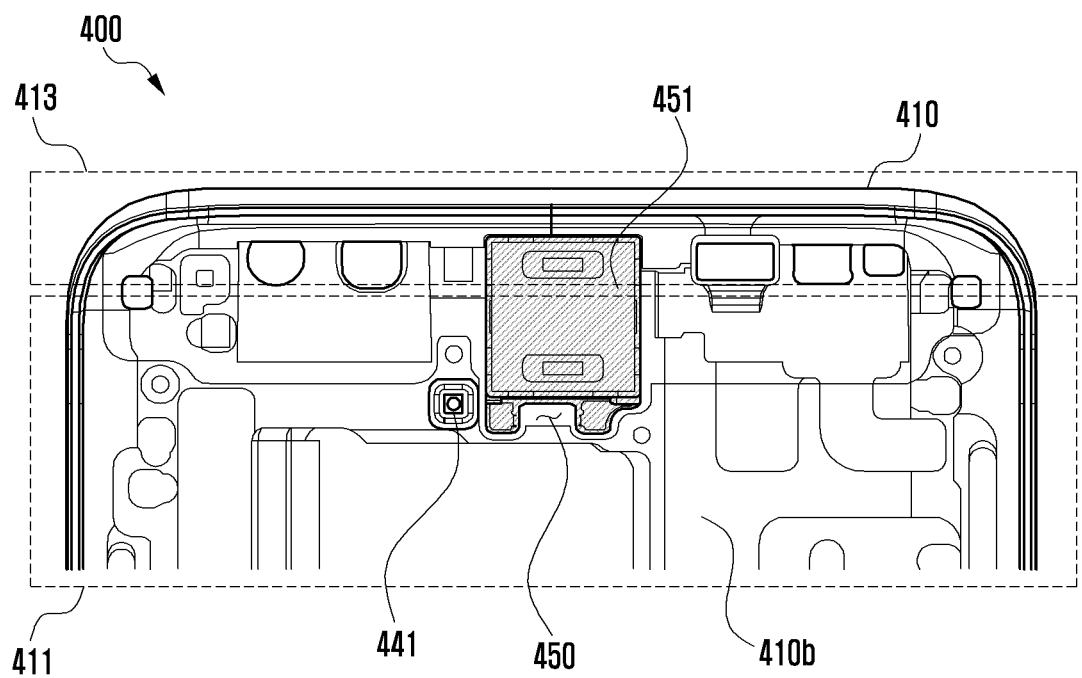
FIG. 6A illustrates a rear surface and a receiver of an electronic device according to an embodiment.

FIG. 6A illustrates a rear surface and a receiver of an electronic device according to an embodiment.

Referring to FIG. 6A, the rear surface 410*b* of the inner structure 410 includes a first region 411 and a second region 411, corresponding to the front surface 410*a*. The first region 411 includes a rear portion corresponding to an area in which a display of the front surface of the inner structure 410 is placed, and the second region 413 includes the remaining areas.

The receiver receiving space 450 of the electronic device 400 is formed over the first region 411 and the second region 413 of the rear surface 410*b* of the inner structure 410. The receiver receiving space 450 is a space for receiving the receiver 451 therein, and may have a predetermined acoustic space to discharge a sound output from the receiver 451, in addition to a space occupied by the receiver 451. The acoustic space may be a passage between the receiver hole 420 of FIG. 5A and the first through-hole 430.

Figure 6B:
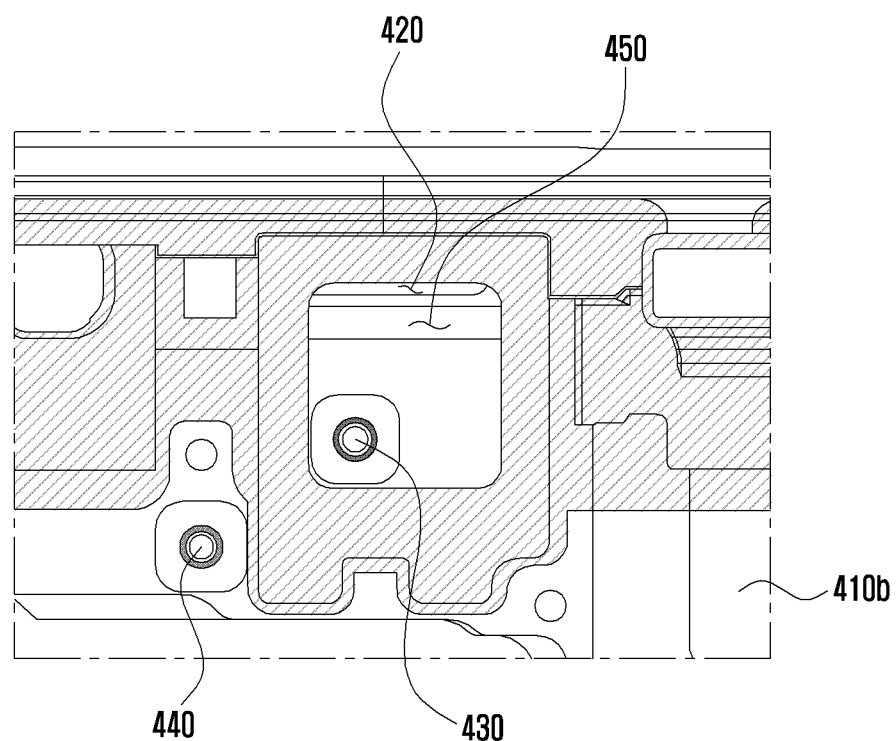
FIG. 6B illustrates an enlarged view of a portion of a rear surface of an electronic device according to an embodiment.
Figure 6C:
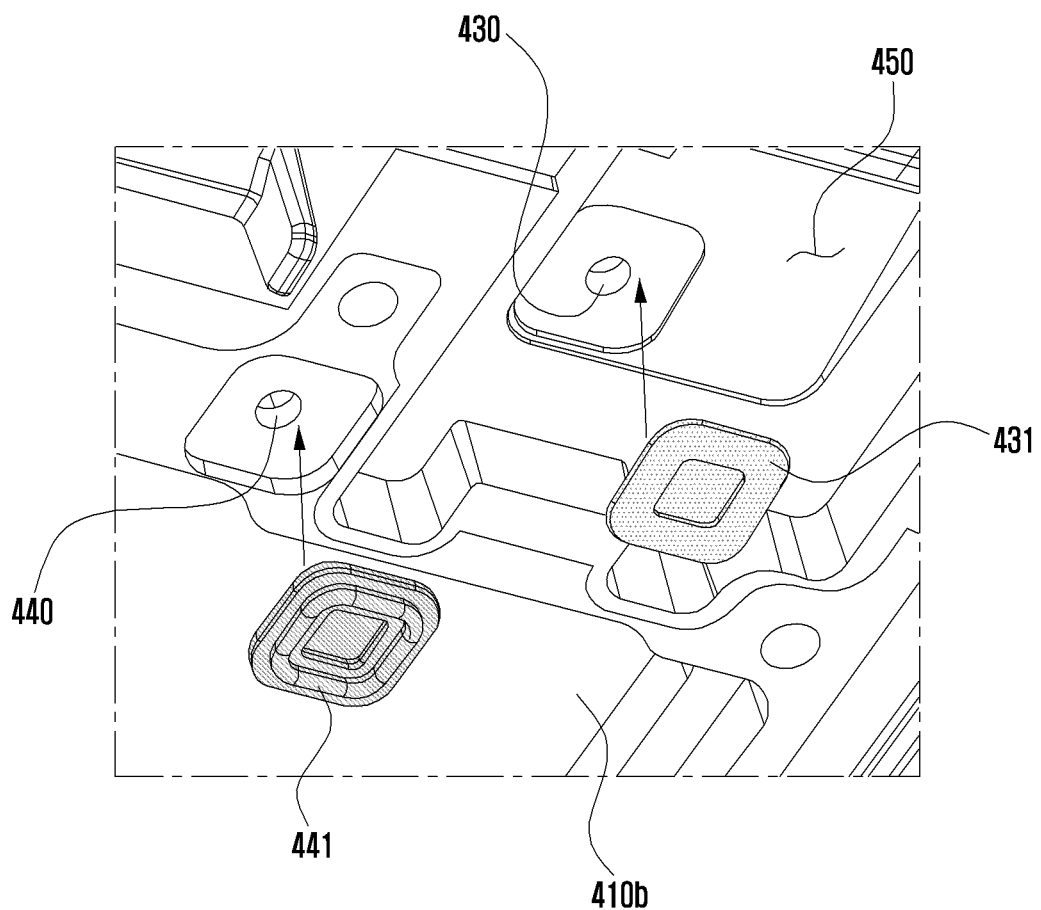
FIG. 6C illustrates an enlarged view of an inner structure of an electronic device in which a receiver is removed according to an embodiment.
Figure 6D:
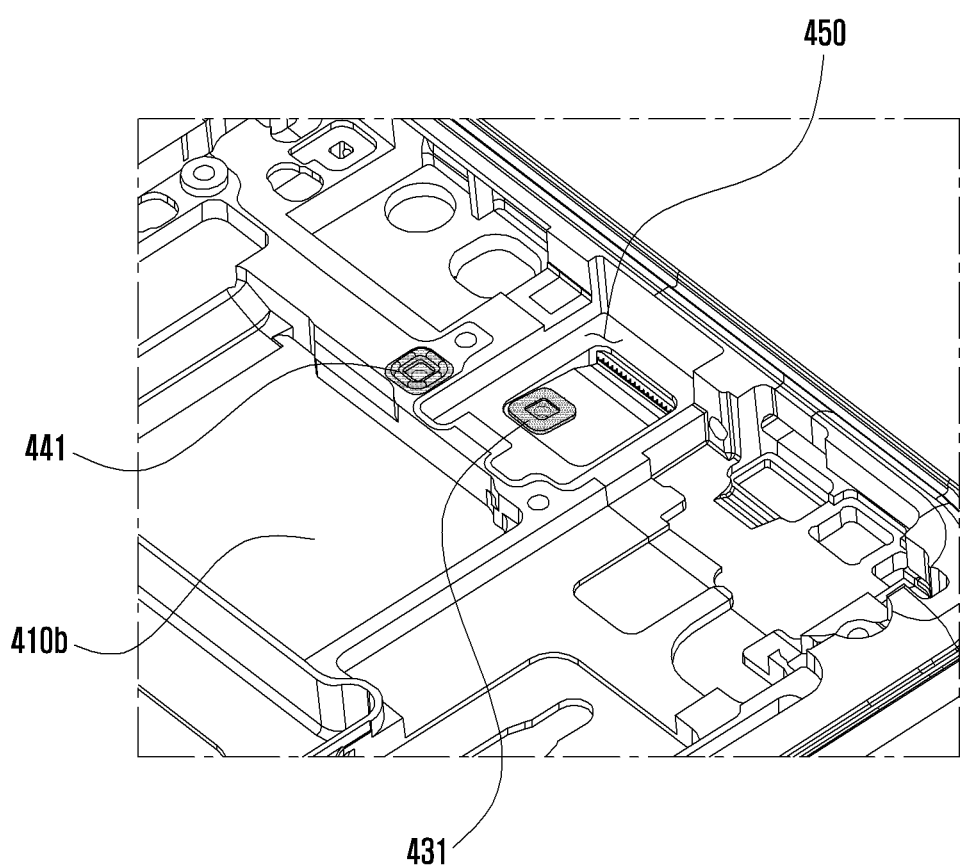
FIG. 6D illustrates an enlarged view of an inner structure of an electronic device in which a receiver is removed according to an embodiment.

FIG. 6B illustrates an enlarged view of a portion of a rear surface of an electronic device according to an embodiment, and FIGS. 6C and 6D illustrate an enlarged view of an inner structure of an electronic device in which a receiver is removed according to an embodiment.

More specifically, FIG. 6B illustrates a state in which the receiver 451, the first sealing gasket 431, and the second sealing gasket 441 are removed, and FIG. 6C is an enlarged exploded perspective view illustrating the first through-hole 430, the second through-hole 440, the first sealing gasket 431, and the second sealing gasket 441.

The receiver hole 420 of FIG. 6B may have the same configuration as the receiver hole 420 of FIG. 5D and may represent a state viewed from the rear surface 410*b* of the inner structure 410. When the receiver receiving space 450 is connected with the outside of the electronic device through the receiver hole 420, if moisture enters via the receiver hole 420 and the first through-hole 430, components within the electronic device and the display may be damaged. Therefore, by disposing the first sealing gasket 431, components within the electronic device 400 can be prevented from being damaged. However, because the first sealing gasket 431 should prevents inflow of moisture, but allow the inflow of a sound or a gas, the first sealing gasket 431 may be formed to prevent only inflow of, moisture. For example, the first sealing gasket 431 may be made of a material such as a water repellent work mesh or Gore-Tex®.

When an electronic component, such as a microphone or a gas sensor may be disposed at a peripheral component (e.g., the circuit board 485 of FIG. 7) to correspond to a position of the second through-hole 440, a space between the second through-hole 440 and the electronic component may be sealed to guide a sound or gas entering through the receiver hole, the receiver receiving space 450, the first through-hole 430, and the flow path to the electronic component side and to block inflow of moisture. Otherwise, an entered sound or gas may be diffused into the electronic device through a space between the second through-hole 440 and the electronic component, and the electronic component may detect a sound or gas and detection accuracy may be deteriorated.

As illustrated in FIGS. 6B to 6D, the second sealing gasket 441 is disposed between the microphone or the gas sensor around the second through-hole 440 to prevent a sound or gas from being diffused into the electronic device and to guide a sound or gas to the electronic component side. Further, the second sealing gasket 441 may be formed to prevent only inflow of water. For example, the second sealing gasket 441 may be made of a material such as a water repellent work mesh or Gore-Tex®.

The second sealing gasket 441 may be made of an elastic material such as a rubber material or a silicon material or may be made of an adhesive material such as a tape. The second sealing gasket 441 is compressed between a periphery of the second through-hole 440 and the circuit board 485 to complete a sealing structure, thereby preventing a sound or gas from being diffused into the electronic device.

FIG. 7 illustrates a cross-sectional view of an inner structure of an electronic device taken along line AA of FIG. 1, according to an embodiment.

Referring to FIG. 7, a hole formed at the leftmost may be a receiver hole 420, a hole formed at the right of the receiver hole 420 may be a first through-hole 430, and a hole formed at the right of the first through-hole 430 may be a second through-hole 440.

The receiver hole 420 may connect the receiver receiving space 450 and an external space of the inner structure 410. The external space of the inner structure 410 may refer to a space in which air exists outside of the electronic structure 400. The receiver hole 420 may penetrate the front surface, the rear surface, or the side surface of the inner structure 410 to be connected to the external space. According to an embodiment, the receiver hole 420 may penetrate the inner structure 410 and the window glass 490 to be connected to the external space.

The first through-hole 430 may be formed apart from the receiver hole 420 and may connect the receiver receiving space 450 to a front surface of the inner structure 410 in the first region 411. Alternatively, the first through-hole 430 may connect the receiver receiving space 450 to the front surface of the inner structure 410 and a closed space formed by the display 480 in the first region 411.

The second through-hole 440 may be formed apart from the first through-hole 430 and may connect the front surface and the rear surface of the inner structure 410 in the first region 411 of the inner structure 410. Specifically, the second through-hole 440 may connect a space formed between the front surface of the inner structure 410 and the rear surface of the display 480 and a space formed between another component (e.g., the circuit board 485) disposed at the rear surface side of the inner structure 410 and the rear surface side of the inner structure 410.

The rear surface side of the inner structure 410 may be an internal space in which various components including a processor are disposed within the electronic device. For example, a circuit board 485 in which various electronic components 470 are mounted may be disposed thereto. In an embodiment of the electronic component 470 mounted in the circuit board 485, a microphone may be disposed to face the second through-hole 440.

The flow path 460 may be formed in a space between the front surface of the inner structure 410 and the rear surface of the display 480. The flow path 460 may connect the first through-hole 430 and the second through-hole 440. The first through-hole 430 and the second through-hole 440 may be connected through an empty space randomly formed between the front surface of the inner structure 410 and the display 480, but in order to specify a connection path of the first through-hole 430 and the second through-hole 440, the flow path 460 may be formed in a sunken shape in the front surface of the inner structure 410, e.g., as illustrated in FIG. 7.

By sealing the flow path 460 with the gasket sheet 461, a tubular flow path 460 may be formed. Through the tubular flow path 460, a sound or gas entering from the outside may be guided to the electronic component 470, instead of being diffused into the electronic device.

A first sealing structure corresponding to the gasket sheet 461 may include a waterproof sheet 461a and an adhesive member 461b. The waterproof sheet 461a may be attached to the display 480 or the inner structure 410 through the adhesive member 461b to seal the flow path 460 or the second channel 460.

In a conduit structure as illustrated in FIG. 7, a space of the rear surface side of the inner structure 410, i.e., an internal space of the electronic device 400, may be connected to an external space through the second through-hole 440, the flow path 460, the first through-hole 430, the receiver receiving space 450, and the receiver hole 420.

The electronic component 470 may be disposed at the rear side of the inner structure 410 of the second through-hole 440 to serve as a conduit therefor. For example, a microphone may be disposed at the conduit, and a path may be provided for an external sound to reach the microphone using a conduit structure of an electronic device.

A gas sensor may be disposed as the electronic component 470 mounted in the circuit board 485, and a path may be provided for an identification of a target gas outside of an electronic device to reach to the gas sensor using a conduit structure of the electronic device.

The electronic device further includes a first sealing gasket 431 and a second sealing gasket 441.

The first sealing gasket 431 may be disposed to block moisture entered from the outside. However, because the first sealing gasket 431 blocks inflow of moisture, but should not block inflow of a sound or a gas, the first sealing gasket 431 may be formed to prevent only the inflow of moisture. For example, the first sealing gasket 431 may be made of a water repellent work mash or Gore-Tex®.

The first sealing gasket 431 includes a waterproof sheet 431a and an adhesive member 431b. The waterproof sheet 431a may be made of a water repellent work mash or Gore-Tex® and may be bonded to the inner structure 410 through an adhesive member.

The first sealing gasket 431 may seal a space between the second through-hole 440 and the electronic component 440 to guide a sound or gas entered from the outside to the electronic component 470, instead of being diffused into the electronic device 400 through a space between the second through-hole 440 and the electronic component 470.

As illustrated in FIG. 7, a second sealing gasket 441 is disposed between a periphery of the second through-hole 440 and the electronic component 470 to prevent a sound or gas from being diffused into the electronic device 400 and to guide a sound or gas to the electronic component 470.

The second sealing gasket 441 may be made of an elastic material, such as a rubber material or a silicone material, and maybe compressed between a periphery of the second through-hole 440 and the circuit board 485 to complete a sealing structure, thereby preventing sound or gas from being diffused into the electronic device 400.

The second sealing gasket 441 includes an elastic structure 441c, waterproof sheet 441a, and adhesive member 441b. The elastic structure 441c may seal a space between the adhesive member 441b and the circuit board 485. The waterproof sheet 441a may be made of an elastic material, such as the rubber material or the silicone material, and may be bonded to the inner structure 410 or the circuit board 485 through the adhesive member 441b.

Figure 8:
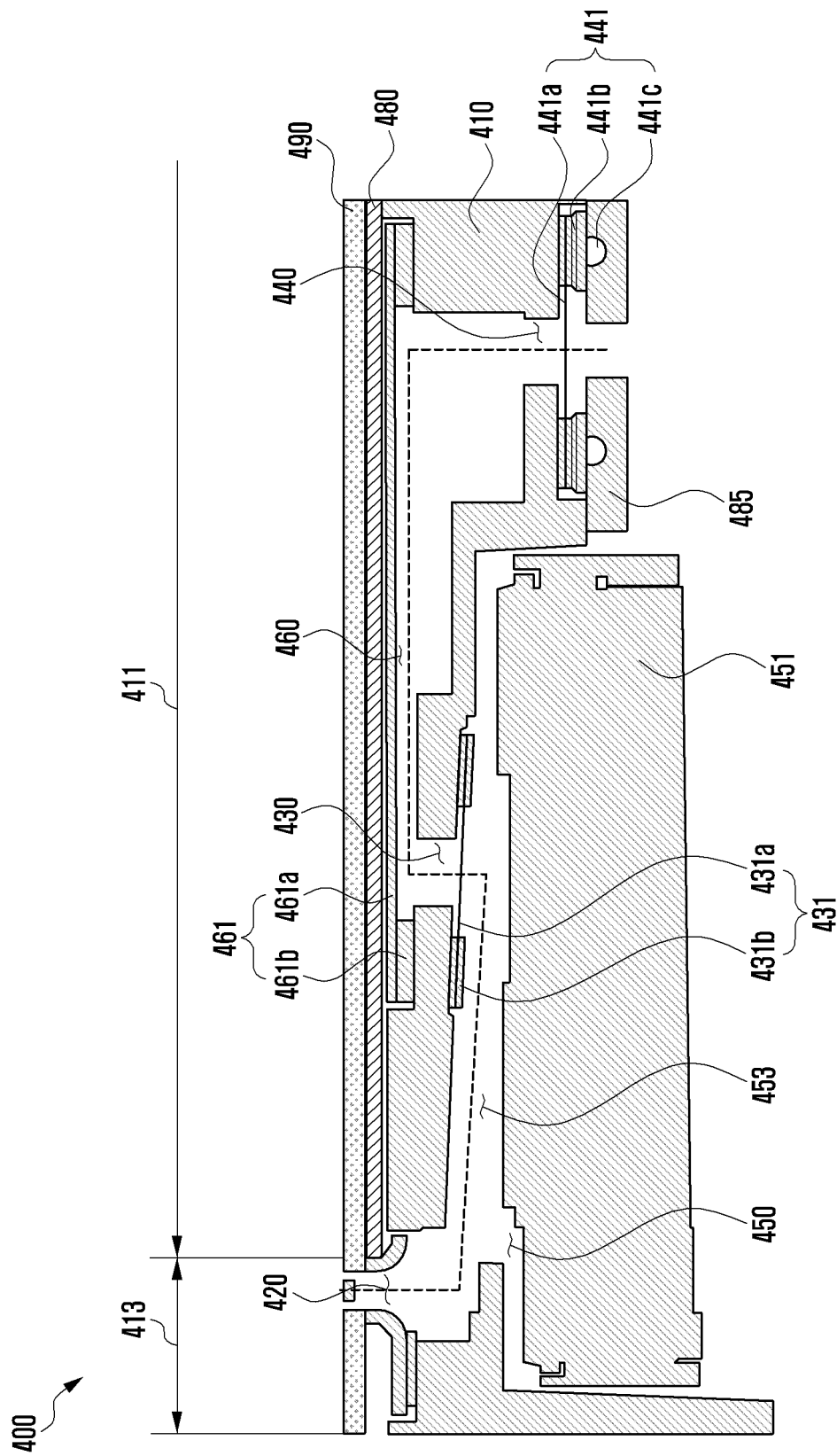
FIG. 8 illustrates a cross-sectional view of an inner structure of an electronic device according to an embodiment.

FIG. 8 illustrates a cross-sectional view of an inner structure of an electronic device according to an embodiment.

Because the same reference numerals as those of the embodiment of FIG. 7 are used for the same components in FIG. 8, a detailed description thereof is omitted, and only dissimilar constituent elements are described below in detail.

Referring to FIG. 8, unlike FIG. 7, components of the electronic device 400 may not be disposed in the second through-hole 440.

As described above, an internal space of the electronic device 400 may be connected to an external space through the second through-hole 440, the flow path 460, the first through-hole 430, the receiver receiving space 450, and the receiver hole 420.

When a space between the internal space and the external space of the electronic device 400 is sealed, a pressure difference may occur between the inside and the outside of the electronic device, and an atmospheric pressure may be applied to the component inside the electronic device 400 because of the pressure difference. When a force is applied to the component inside the electronic device 400, the force may affect an operating performance of the component. For example, in the case of a thin film component, when an atmospheric pressure is applied to the component, a function of the component may deteriorate or the component may not operate.

By providing a passage between the internal space and the external space of the electronic device 400, as illustrated in FIG. 8, a pressure difference can be prevented from occurring, and a function deterioration phenomenon of the electronic device according to occurrence of a sealing state inside the electronic device 400 can be prevented.

Figure 9A:
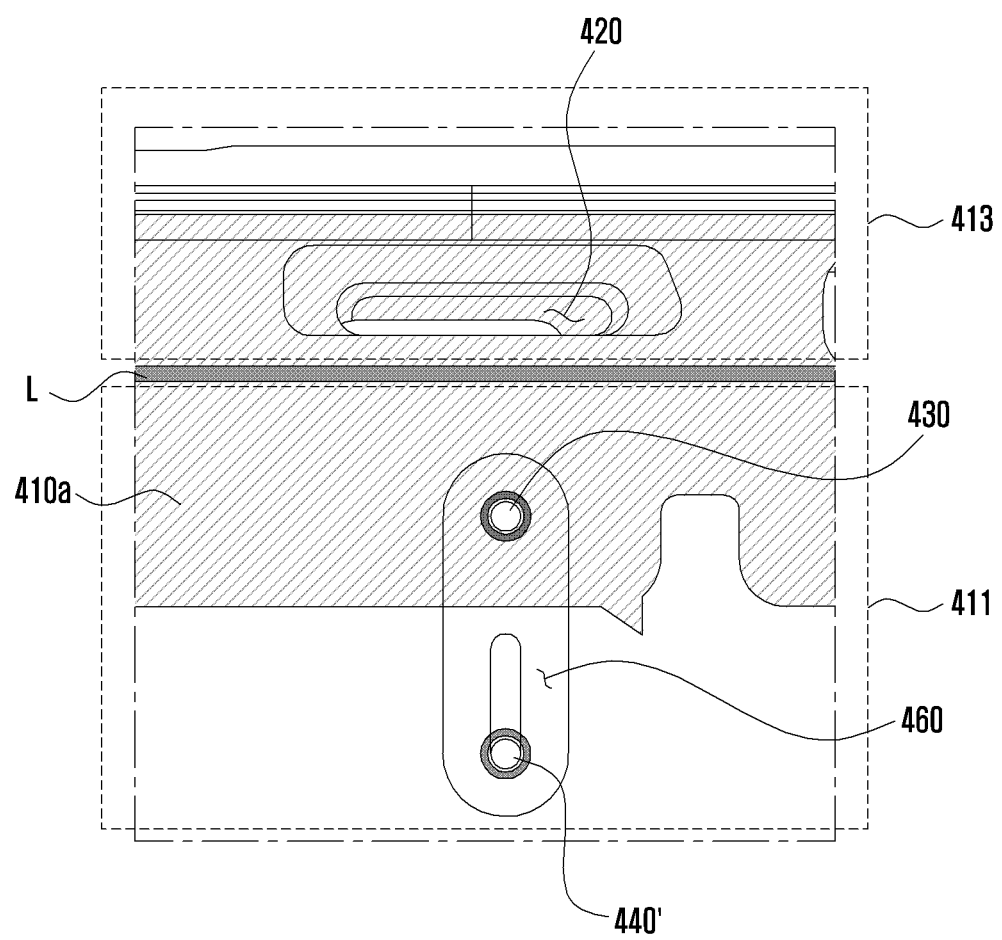
FIG. 9A illustrates an enlarged view of a portion of a front surface of an electronic device according to an embodiment.
Figure 9B:
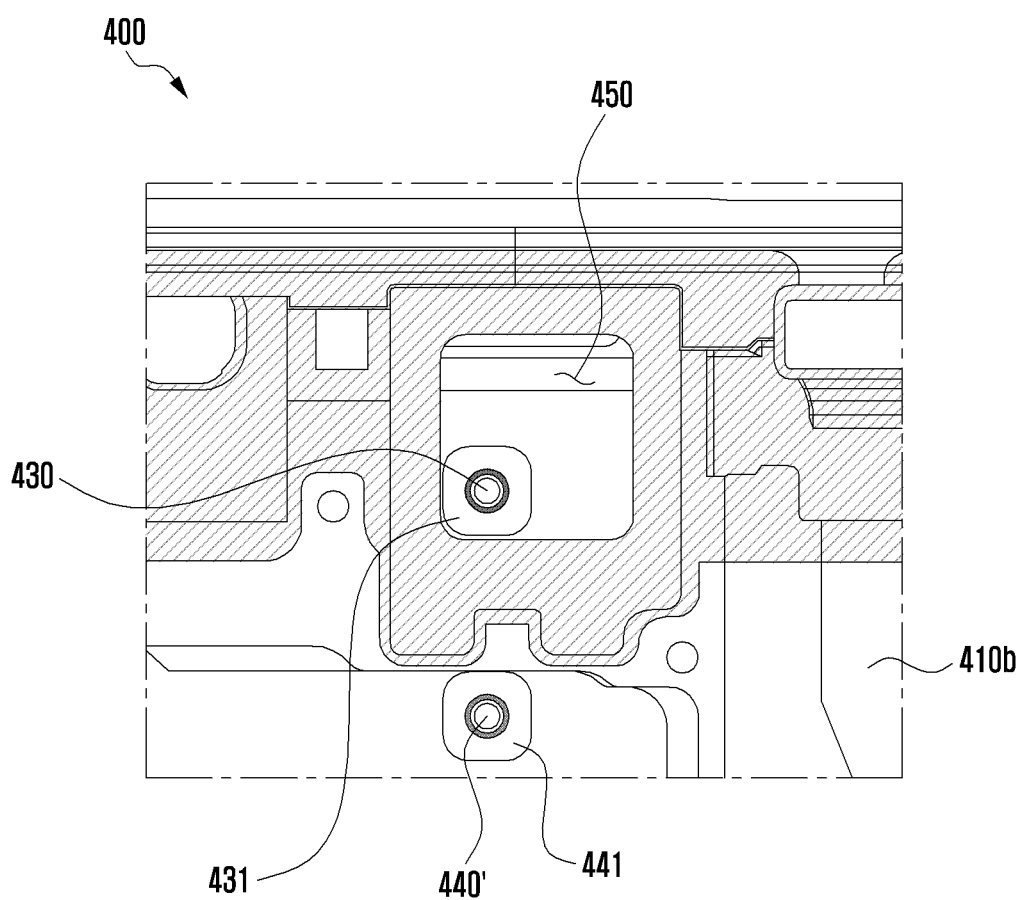
FIG. 9B illustrates an enlarged view of a portion of a front surface of an inner structure of an electronic device according to an embodiment.

FIG. 9A illustrates an enlarged view of a portion of a front surface of an electronic device according to an embodiment, and FIG. 9B illustrates an enlarged view of a portion of a front surface of an inner structure of an electronic device according to an embodiment.

In describing part of the front surface 410a and part of the rear surface 410b of the inner structure in FIGS. 9A and 9B, the same reference numerals as those of the embodiment of FIG. 5D or 6B are used for the same components; therefore, detailed descriptions thereof are omitted, and only dissimilar constituent elements of FIGS. 9A and 9B are described below in detail.

An imaginary straight line connecting a first through-hole 430 and a second through-hole 440' may be aligned in a longitudinal direction or a width direction of the inner structure 410, as described above with reference to FIG. 5D. For example, as illustrated in FIG. 9A or 9B, the first through-hole 430 and the second through-hole 440' maybe aligned in a longitudinal direction of the inner structure 410.

Because a position of the second through-hole 440' may be changed, when designing a conduit structure of the electronic device, the degree of freedom of design can be improved.

Figure 10:
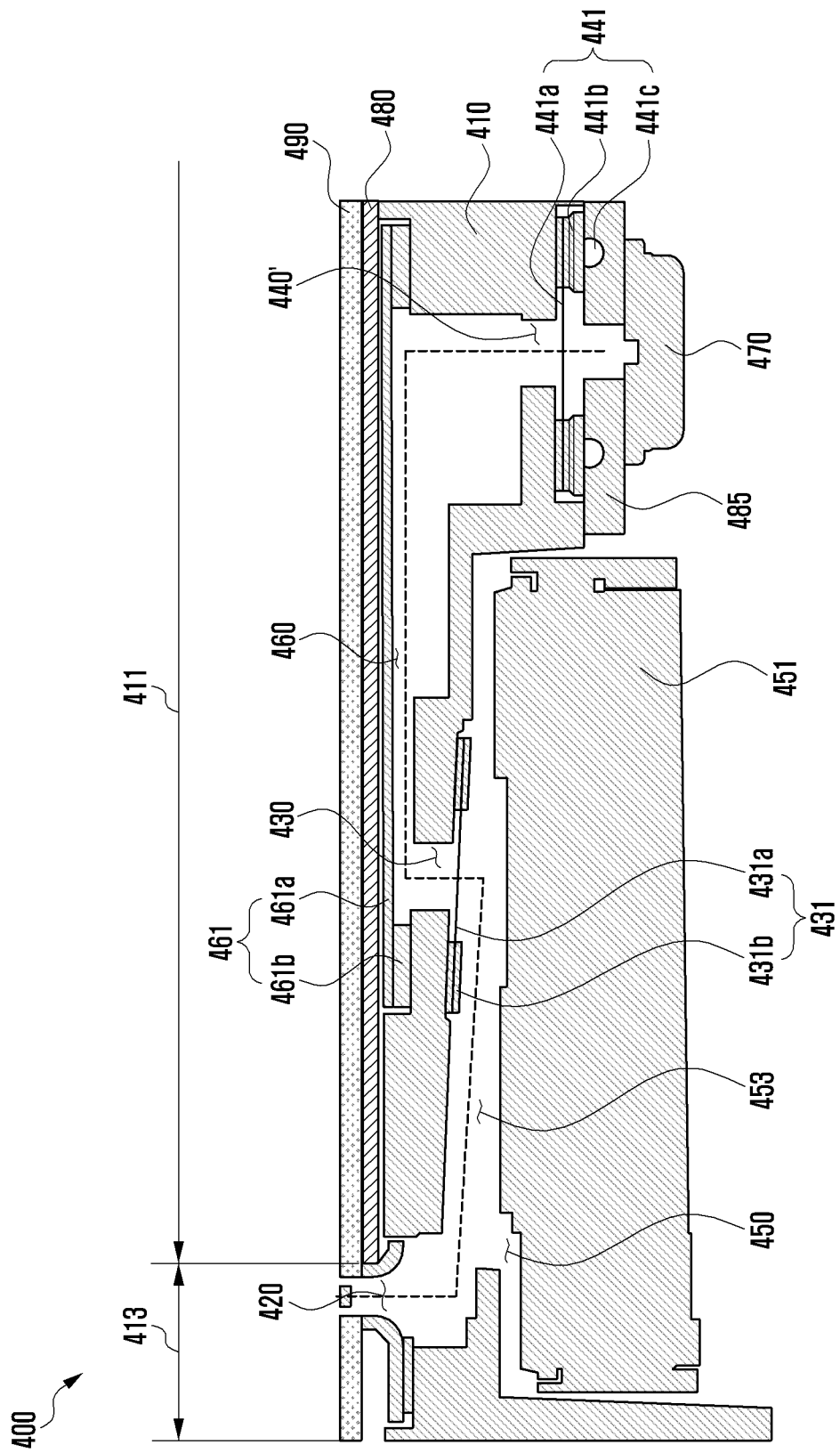
FIG. 10 illustrates a cross-sectional view of an inner structure of an electronic device taken along line AA of FIG. 1, according to an embodiment.

FIG. 10 illustrates a cross-sectional view of an inner structure of an electronic device taken along line AA of FIG. 1, according to an embodiment.

Because the same reference numerals as those of the embodiment of FIG. 7 are used for the same components in FIG. 10, a detailed description thereof is omitted, and only dissimilar constituent elements are described below in detail.

Referring to FIG. 10, the flow path 460 may specify a connection path of the first through-hole 430 and the second through-hole 440.

However, instead of using a gasket sheet 461 as illustrated in FIG. 7, by coming in close contact the flow path 460 with a component such as the display 480, the flow path 460 may be formed in a tubular shape in FIG. 10. Thereby, a path may be provided for a sound or gas entering from the outside to reach a microphone or a gas sensor, instead of being diffused into the electronic device 400.

According to an embodiment, a conduit structure of an electronic device includes an inner structure that is configured to receive a display in a first region, which is a portion of a front surface; a receiver hole configured to penetrate a second region, which is the remaining areas of a front surface of the inner structure and to connect a receiver receiving space and an external space of the inner structure; a first through-hole configured to penetrate a first region of the inner structure and to connect the receiver receiving space and a front surface of the inner structure; a second through-hole spaced apart from the first through-hole to penetrate the first region of the inner structure and configured to connect a rear surface of the inner structure; and a flow path configured to communicate the first through-hole and the second through-hole at the front surface of the inner structure.

The conduit structure may further include a gasket sheet configured to cover and seal the flow path at the front surface of the inner structure.

The first through-hole 430 and the second through-hole may be disposed such that an imaginary straight line connecting the first through-hole and the second through-hole deviates from a longitudinal direction or a width direction of the inner structure.

At the receiver receiving space side of the first through-hole, a first sealing gasket configured to block a liquid from passing through and to pass through a gas may be disposed.

An electronic component may be disposed at the rear surface side of the inner structure of the second through-hole.

The electronic component may be a microphone or a gas sensor.

The electronic component may be disposed to block the rear surface side of the inner structure of the second through-hole, and a second sealing gasket may be disposed to seal between a periphery of the second through-hole and the electronic component.

The receiver receiving space may be formed in the rear surface of the inner structure and may be formed over the first region and the second region.

The conduit structure may further include window glass configured to cover both the first region and the second region of the inner structure and to expose the receiver hole.

According to an embodiment, an electronic device includes a display; an inner structure configured to receive the display in a first region, which is a portion of a front surface; a receiver receiving space positioned at a rear surface of the inner structure and configured to receive a receiver; a receiver hole connected to the receiver receiving space and configured to penetrate a second region, which is the remaining areas of a front surface of the inner structure; a first through-hole configured to penetrate a first region of the inner structure and to connect the receiver receiving space and the front surface of the inner structure; a second through-hole spaced apart from the first through-hole to penetrate the first region of the inner structure and configured to connect a rear surface of the inner structure; and a flow path configured to communicate the first through-hole and the second through-hole at the front surface of the inner structure.

The electronic device may further include a gasket sheet configured to cover and seal the flow path at the front surface of the inner structure.

The first through-hole and the second through-hole may be disposed such that an imaginary straight line connecting the first through-hole and the second through-hole deviates from a longitudinal direction or a width direction of the inner structure.

At the receiver receiving space side of the first through-hole, a first sealing gasket configured to block a liquid from passing through, but to pass through a gas may be disposed.

An electronic component maybe disposed at the rear surface side of the inner structure of the second through-hole.

The electronic component may be a microphone or a gas sensor.

The electronic component may be disposed to block the rear surface side of the inner structure of the second through-hole, and a second sealing gasket may be disposed to seal between a periphery of the second through-hole and the electronic component.

The receiver receiving space may be formed at a rear surface of the inner structure and be formed over the first region and the second region.

The electronic device may further include window glass formed to cover both the first region and the second region of the inner structure and configured to expose the receiver hole.

According to an embodiment, an electronic device includes a housing including a first plate, a second plate configured to face in a direction opposite to that of the first plate, and a side member configured to enclose a space between the first plate and the second plate; a display exposed through a first region of the first plate; an inner structure disposed between the display 480 and the second plate; a speaker disposed between the inner structure and the second plate, wherein the speaker communicates a sound with the outside of the housing through a first opening formed in a second region of the first plate, includes a surface facing the first plate, and is spaced apart from the inner structure to form a first channel between the surface and the inner structure, a microphone disposed between the inner structure and the second plate and spaced apart from the speaker when viewed above the first plate; a second opening configured to penetrate the inner structure between the microphone and the display; a second channel formed between the inner structure and the display; a third opening configured to penetrate the inner structure between the first channel and the second channel; the first channel; and the microphone configured to penetrate the first opening to communicate a sound with the outside of the housing.

The electronic device may further include an elastic structure interposed between the microphone and the inner structure.

The electronic device may further include a first sealing structure within the second channel.

The electronic device may further include a second sealing structure disposed within the first channel.

The second sealing structure maybe attached to a periphery of the third opening or the third opening.

The first sealing structure may be attached to the display.

As described above, according to the present disclosure, a hole or conduit that provides a passage between a component of an electronic device and the outside can be disposed at a rear surface of a display of the electronic device. Therefore, in the design of electronic devices, the degree of freedom in a disposition of electronic device components can increase.

An existing receiver hole or receiver receiving space can be used without separately forming a hole or a conduit for a component of the electronic device.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
   a display;
   an inner structure including a front surface and a rear surface, wherein the front surface includes a first region configured to receive the display and a second region, which is a remaining area of the front surface of the inner structure;
   a receiver receiving space positioned at the rear surface of the inner structure and configured to receive a receiver;
   a receiver hole connected to the receiver receiving space and configured to penetrate the second region;
   a first through-hole configured to penetrate the first region and to connect the receiver receiving space and the front surface of the inner structure;
   a second through-hole spaced apart from the first through-hole, wherein the second through-hole is configured to penetrate the first region and connect to the rear surface of the inner structure; and
   a flow path configured to connect the first through-hole and the second through-hole at the front surface of the inner structure,
   wherein the receiver hole, the first through-hole, and the second through-hole each penetrate the inner structure.

2. The electronic device of claim 1, further comprising a gasket sheet configured to cover and seal the flow path at the front surface of the inner structure.

3. The electronic device of claim 1, wherein the first through-hole and the second through-hole are disposed such that a straight line connecting the first through-hole and the second through-hole deviates from at least one of a longitudinal direction or a width direction of the inner structure.

4. The electronic device of claim 1, further comprising a first sealing gasket, at the receiver receiving space side of the first through-hole, the first sealing gasket configured to block liquid from passing, but to permit gas to pass through.

5. The electronic device of claim 1, further comprising an electronic component disposed at the rear surface side of the second through-hole.

6. The electronic device of claim 5, wherein the electronic component comprises a microphone or a gas sensor.

7. The electronic device of claim 5, further comprising a second sealing gasket,
   wherein the electronic component blocks the rear surface side of the second through-hole, and
   wherein the second sealing gasket seals between a periphery of the second through-hole and the electronic component.

8. The electronic device of claim 1, wherein the receiver receiving space is formed at the rear surface of the inner structure and is formed over the first region and the second region.

9. The electronic device of claim 1, further comprising window glass covering the first region and the second region of the inner structure, and configured to expose the receiver hole.

10. An electronic device, comprising:
    a housing including a first plate, a second plate configured to face in a direction opposite to that of the first plate, and a side member configured to enclose a space between the first plate and the second plate;
    a display exposed through a first region of the first plate;
    an inner structure disposed between the display and the second plate;
    a speaker disposed between the inner structure and the second plate, wherein the speaker communicates sound to outside of the housing through a first opening formed in a second region of the first plate, comprises a surface facing the first plate, and is spaced apart from the inner structure to form a first channel between the surface and the inner structure;
    a microphone disposed between the inner structure and the second plate, wherein the microphone is spaced apart from the speaker;
    a second opening configured to penetrate the inner structure between the microphone and the display;
    a second channel formed between the inner structure and the display; and
    a third opening configured to penetrate the inner structure between the first channel and the second channel,
    wherein the microphone is configured to receive sound from the outside of the housing via the first opening.

11. The electronic device of claim 10, further comprising an elastic structure interposed between the microphone and the inner structure.

12. The electronic device of claim 10, further comprising a first sealing structure within the second channel.

13. The electronic device of claim 12, further comprising a second sealing structure disposed within the first channel.

14. The electronic device of claim 13, wherein the second sealing structure is attached to the third opening.

15. The electronic device of claim 13, wherein the first sealing structure is attached to the display.

16. A conduit structure of an electronic device, the conduit structure comprising:
- an inner structure including a front surface and a rear surface, wherein the front surface includes a first region configured to receive a display and a second region, which is a remaining area of the front surface of the inner structure;
- a receiver hole configured to penetrate the second region and to connect a receiver receiving space and an external space of the inner structure;
- a first through-hole configured to penetrate the first region and to connect the receiver receiving space and the front surface of the inner structure;
- a second through-hole spaced apart from the first through-hole, wherein the second through-hole is configured to penetrate the first region and connect to the rear surface of the inner structure; and
- a flow path configured to connect the first through-hole and the second through-hole at the front surface of the inner structure,
- wherein the receiver hole, the first through-hole, and the second through-hole each penetrate the inner structure.

17. The conduit structure of claim 16, further comprising a gasket sheet configured to cover and seal the flow path at the front surface of the inner structure.

18. The conduit structure of claim 16, wherein the first through-hole and the second through-hole are disposed such that a straight line connecting the first through-hole and the second through-hole deviates from at least one of a longitudinal direction or a width direction of the inner structure.

19. The conduit structure of claim 16, further comprising a first sealing gasket, at the receiver receiving space side of the first through-hole, the first sealing gasket configured to block liquid from passing, and to permit gas to pass through.

20. The conduit structure of claim 16, further comprising an electronic component disposed at the rear surface side of the second through-hole.

\* \* \* \* \*